United States Patent [19]

Raney, Jr.

[11] 4,160,981

[45] Jul. 10, 1979

[54] CRT VIDEO TEXT LAYOUT SYSTEM HAVING HORIZONTAL SCROLLING

[75] Inventor: Meredith T. Raney, Jr., Melbourne, Fla.

[73] Assignee: Harris Corporation, Cleveland, Ohio

[21] Appl. No.: 803,842

[22] Filed: Jun. 6, 1977

[51] Int. Cl.² .............................................. G06K 15/20

[52] U.S. Cl. ........................................ 340/721; 354/6; 340/724; 340/748

[58] Field of Search .................... 340/324 AD, 324 A; 354/6, 7

[56] References Cited

U.S. PATENT DOCUMENTS

| | | | |
|---|---|---|---|
| 3,403,391 | 9/1968 | McCown | 340/324 A |
| 3,540,012 | 11/1970 | Ehrman | 340/324 A |
| 3,637,997 | 1/1972 | Petersen | 340/324 A |
| 3,668,685 | 6/1972 | Horvath | 354/7 |
| 3,696,391 | 10/1972 | Peronneau | 340/324 A |
| 3,742,288 | 6/1973 | Albrecht et al. | 340/324 AD |
| 3,801,961 | 4/1974 | Coombe | 340/324 AD |
| 3,872,460 | 3/1975 | Fredrickson et al. | 354/6 |

*Primary Examiner*—David L. Trafton
*Attorney, Agent, or Firm*—Craig & Antonelli

[57] ABSTRACT

A circuit in a video layout system permits the operator to view any portion of text material whose width exceeds that of a display screen of a CRT. The circuit has an operator controllable, variable reference signal generator which provides a signal whose amplitude with respect to an initial amplitude is related to the desired direction and degree of scrolling. This reference signal is subtracted from the horizontal deflection ramp signal to produce an offset ramp signal. A comparator compares the ramp and reference signals and blanks the electron beam until the ramp exceeds the reference to prevent text information from being displayed on the parameter section of the display screen.

13 Claims, 1 Drawing Figure

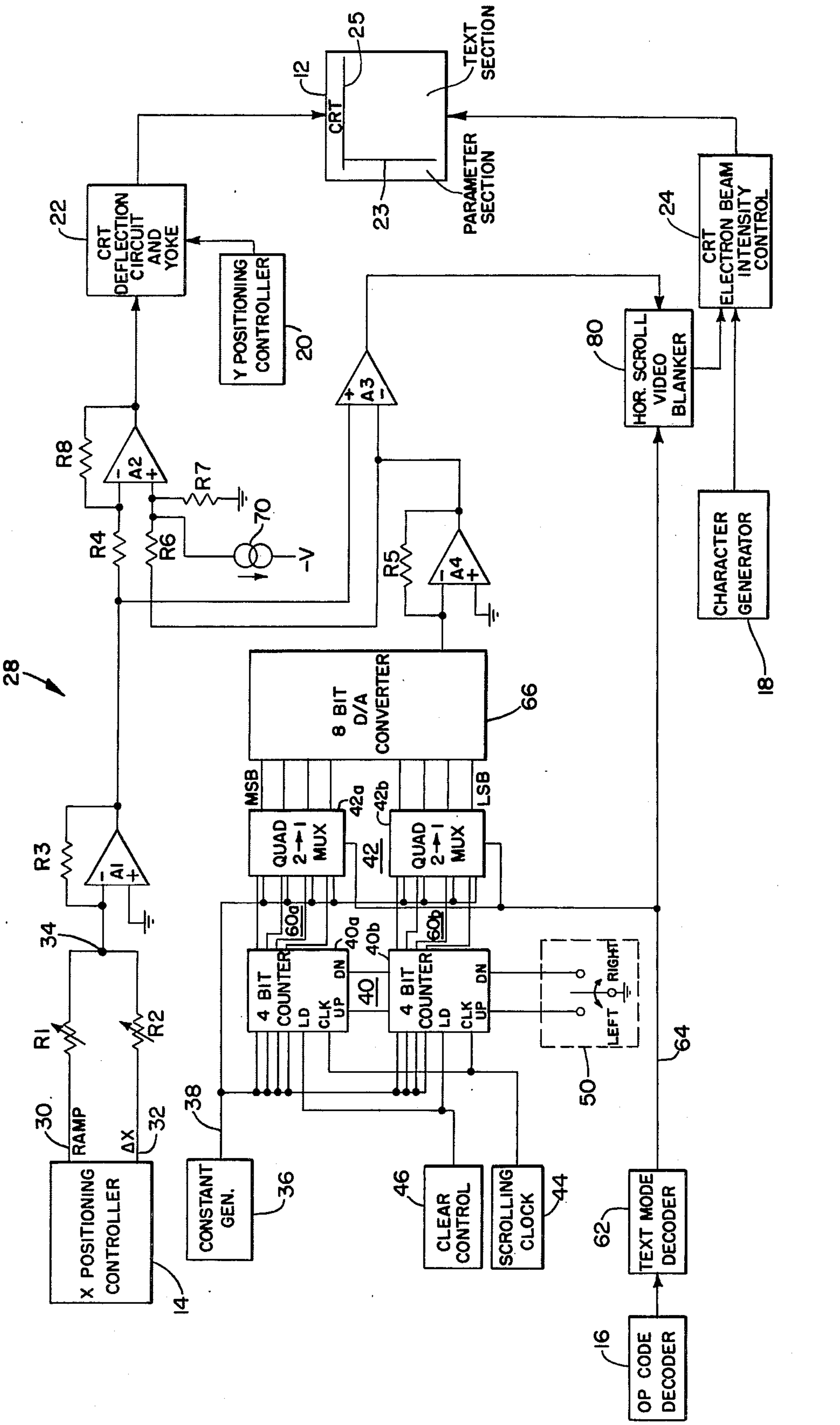
CRT
TEXT SECTION
PARAMETER SECTION
CRT DEFLECTION CIRCUIT AND YOKE
Y POSITIONING CONTROLLER
CRT ELECTRON BEAM INTENSITY CONTROL
HOR. SCROLL VIDEO BLANKER
CHARACTER GENERATOR
8 BIT D/A CONVERTER
MSB
LSB
QUAD 2→1 MUX
QUAD 2→1 MUX
4 BIT COUNTER
LD
CLK
UP
DN
4 BIT COUNTER
LD
CLK
UP
DN
LEFT
RIGHT
X POSITIONING CONTROLLER
RAMP
ΔX
CONSTANT GEN.
CLEAR CONTROL
SCROLLING CLOCK
TEXT MODE DECODER
OP CODE DECODER
R1
R2
R3
R4
R5
R6
R7
R8
A1
A2
A3
A4
-V

CRT VIDEO TEXT LAYOUT SYSTEM HAVING HORIZONTAL SCROLLING

BACKGROUND OF THE INVENTION

The present invention relates generally to a video layout system and, more specifically, to a system for fitting and correcting copy in a video display prior to typesetting.

A video layout system described in U.S. Pat. No. 3,872,460 provides a system which permits the accurate, rapid preparation for photocomposition of retail and classified display ads, complex straight matter, page composition, area composition and yellow page ads, and is compatible with a broad range of photocomposition and typesetting equipment. The system eliminates the previously required mark up and paste-up of ad elements while reducing the amount of keyboarding relative to that required in heretofore conventional photocomposition.

In this system, copy scanned or keyed into tape is read into a display terminal and is displayed as text on a video screen for layout. Using a keyboard-directed cursor and copyfitting keys, the text is positioned and displayed in actual point size and set width for any desired type font on the screen to match the precise layout desired for the final ad. Layout instructions and text data are processed by a computer in a terminal control unit. Copyfitting, movement of copy blocks, corrections, and changes in point size, film advance or leading, line measure, indent, skew and other typographical functions are immediately displayed in the copy on the screen together with parameter messages constituting layout instructions associated with line blocks of text in the displayed copy. When the operator determines that the displayed copy matches the desired layout he may instruct a tape punch to perforate a paper tape with all text and layout function codes required to drive the typesetting equipment.

While the above described video display system has operated successfully it has been found that it would be desirable to have the feature of being able to view texts blocks that are wider than the text area of the display screen of the CRT. For example, in the above described video layout system the text information section of the CRT screen is approximately 50 picas wide, and if the software programming is allowed to give commands to set type out to 100 picas wide, the text further than 50 picas from the left hand margin of the text display section will be off the CRT display screen, and therefore not visible to the operator. Known past practice has been to scale down the text area to view the entire text content at a magnification of less than 1.

SUMMARY OF THE INVENTION

An object of the invention is to provide a video layout system in which any portion of text blocks that are wider than the CRT width may be displayed without demagnification of the displayed text block.

A further object of the invention is to provide in a video layout system the capability of horizontally scrolling text blocks by a circuit which is uncomplicated and economical to implement.

In an aspect of the invention, a controlled offset is switched into the horizontal deflection circuit after the fixed parameter area of the CRT display has been written to effectively move the text block horizontally so that a portion of the text block not previously on the CRT screen comes into view and the equivalent portion on the opposite side of the screen disappears.

According to the present invention, there is provided an improvement in the video layout system. The layout system is of the type having a cathode ray tube display screen for viewing parameter information on a first section and text information on a second section. The system includes character generating means and vertical and horizontal positioning control means, the horizontal positioning means including a device for generating a ramp signal for controlling the horizontal sweep of an electron beam across the CRT screen. The improvement comprises means for offsetting the start of the ramp signal so that any desired portion of text material having a pica format in excess of the width of the portion of the display screen for text material may be viewed to effect a horizontal scrolling of the text material. Further, means is provided for selectively blanking the electron beam to inhibit text information from being displayed on the parameter section of the screen.

BRIEF DESCRIPTION OF THE DRAWING

In the drawing:

The sole FIGURE is partial block diagram and schematic of the improved video layout system according to the present invention.

DESCRIPTION OF THE PREFERRED EMBODIMENT

In an exemplary embodiment of the present invention, as illustrated in the sole FIGURE of the drawing, there is provided a circuit for generating the horizontal scrolling feature in a video layout system of the type described in U.S. Pat. No. 3,872,460 to W. G. Fredrickson et. al. This patent is assigned to the same assignee as the present patent application and the subject matter of the patent is incorporated herein by reference. The video layout system includes a terminal control unit which communicates with a plurality of video terminals. The drawing illustrates portions of one of the terminals with major portions of the terminal being in block diagram form and with the improved circuit of the invention being shown in detail. A conventional video layout terminal includes a CRT display 12, an X positioning controller 14, an OP CODE decoder 16, a character generator 18, a Y positioning controller 20, a CRT deflection circuit and yoke 22 and a CRT electron beam intensity controller 24. For additional information regarding the purpose and operation of these portions of the terminal reference may be made to the previously referenced patent. In summation however, the X and Y positioning controllers 14 and 20, respectively, provide signals to the CRT deflection circuit and yoke 22 to control the position and movement of the electron beam on the face of the CRT screen 12, and the character generator controls beam intensity in a manner so as to display the desired information. The screen is of the type having a parameter section on the left and a text section on the right with a line 23 defining the transition between display of parameters and text. In the embodiment, this transition line 23 is positioned 128 points from the left edge of the CRT display area. A line 25, which in the embodiment is 12 points from uppper edge of the CRT display area, establishes the upper limit for display of information. An improved circuit 28 is basically coupled between the X positioning controller 14 and the CRT deflection circuit and yoke 22 to provide a horizontal scrolling feature and coupled to the CRT electron beam control 24 to prevent display of text information on the parameter section of the CRT screen. By horizontal scrolling it is meant that any portion of text information in the horizontal direction that is too wide to be displayed in the text section (from line 23 to the far right portion of the CRT) of CRT 12 may be moved into view and previously viewed portions are moved out of view.

The X positioning controller 14 provides outputs at 30 and 32. The output 30 is a set width ramp signal which is coupled to a variable resistor R1, and the output 32 is ΔX signal coupled to a variable resistor R2. These signals are combined at 34 and applied to a negative terminal of an amplifier A1 whose output is feedback coupled by a resistor R3 to the summing point 34. A positive terminal of amplifier A1 is coupled to ground. The output of amplifier A1 is coupled by a resistor R4 to the negative input of an amplifier A2 and to a positive terminal of a comparator amplifier A3. The set width signal at 30 is a constant slope signal which causes the beam to sweep from an inition position to the right on the display screen. The ΔX signal at 32 is a constant level signal which establishes the initial horizontal sweep position. For example, in the text mode of operation of the terminal wherein it is desired to have a line block of text start at the left hand margin of the text section, ΔX is of a value to set the beam at line 23 on the CRT screen. Resistors R1, R2 and R3 and amplifier A1 comprise an adder circuit to sum the ΔX and the set width ramp signals. The output of amplifier A1 is the actual horizontal deflection signal for the non-scrolled text mode and the parameter mode. The ramp and ΔX signals are negative voltages, and, due to the polarity reversal in A1, the sum of these signals at the output of A1 is a positive voltage.

A constant generator 36 is shown as having an output 38 which is coupled to a counter, represented generally by the reference numeral 40, and to a multiplexer represented generally by the reference numeral 42. The counter 40 in the embodiment is a pair of 4-bit counters, $\mathbf{40}_a$ and $\mathbf{40}_b$, and the multiplexer 42 is a pair of quad, 2 to 1 multiplexers $\mathbf{42}_a$ and $\mathbf{42}_b$. The output of a scrolling clock 44 is coupled to the clock (clk) input of the respective counters $\mathbf{40}_a$ and $\mathbf{40}_b$. In the embodiment the clock rate is 60 Hz but any desired rate may be used. A power-up clear control 46 is coupled to the Load (LD) input of the counters to reset the counters to the value of the constant.

A switch 50 is provided for controlling whether or not the counter 40 is counting and, if so, whether the counter counts up or down. The switch 50 of the embodiment is a single pole, double throw (SPDT) switch with a center off position. When the switch is positioned to the left, the counter counts up from the initial value, and when the switch is positioned to the right, the counter counts down toward the initial value. When the switch is in the center position the counter stops counting and holds its last count.

The outputs $\mathbf{60}_a$ and $\mathbf{60}_b$ of the counter 40 are applied to one of two sets of inputs to the multiplexer 42. The other set of inputs to the multiplexer 42 is coupled to constant generator 36. When the OP code decoder 16 provides information to a text mode decoder 62 indicating that the terminal 10 is in the text mode, as opposed to another mode such as the parameter mode, the text mode decoder 62 provides a signal at 64 which is coupled to the multiplexers to select the counter outputs. Otherwise, the multiplexer selects the constant value coupled from the constant generator 36. The multiplexer outputs are coupled to an 8-bit digital to analog converter 66 whose analog current output is coupled to the negative terminal of an amplifier A4, whose positive terminal is coupled to ground. A feedback resistor R5 is coupled between the negative terminal and the output terminal of amplifier A4. The output of A4 is coupled to the negative terminal of the comparator A3 and to the positive terminal of amplifier A2 via a resistor R6.

The counter 40, multiplexer 42, D/A converter 66, amplifier A3, resistor R5 and switch 50 comprise a circuit to produce a variable reference voltage when the terminal is in the text mode of its refresh cycle. Switch 50 is used to make the counter count up or down or hold count. Switch 50 to the left will move the text to the left, while switch 50 to the right will move the text to the right. The scrolling clock 44 provides a frequency directly proportional to the rate at which the text will move. The initialized condition of the converter is a constant that will produce a reference voltage equivalent to 128 points from the left margin of the screen which is the typical X position starting point for the text mode. The multiplexer 42 is used to switch in this constant when the terminal is not in the text mode. Amplifier A3 and resistor R5 convert the current output of converter 66 to a proportional voltage having a positive polarity.

In the particular embodiment shown, the counter has eight stages and thus is capable of counting up to 255 or $2^8-1$. In establishing the scale of the counter, each bit in the counter is equivalent to 4 points. Thus, to initialize the counter to 128 points requires a logic "1" in the sixth stage and logic "0" in the others thereby providing a count of 32. By reason of decoding circuitry (not shown for reasons of not unduly complicating the drawing), the counter is prevented from counting below the count of 32 (ie. 128 points) or above a maximum value related to the 100 picas width. Otherwise, the counter would reset which would create instability in the display. This decoding circuitry comprises two parts: the first monitors the counter outputs for the condition of the maximum preselected count being reached and then decouples the left switch position of switch 50 from the UP input of the counter; the second monitors the counter outputs for the condition of the 128 point count being reached and then decouples the right switch position of switch 50 from the DN input of the counter.

Refering now to amplifier A2, a source 70 of constant current is coupled to the positive terminal of A2 and a resistor R7 is coupled between ground and the positive terminal of amplifier A2. A feedback resistor R8 is coupled between the output and negative input of A2. The output of amplifier A2 is coupled to the CRT deflector circuit 22 to control horizontal deflection. Resistors R4, R7 and R8 and amplifier A2 comprise a subtractor circuit which subtracts the variable reference voltage from amplifier A3 from the X deflection signal from amplifier A1 to move the beam back to the left hand margin of the text area at the time the beam intensity is enabled by comparator A3. The constant current source 70 is used to offset the subtractor so that there is a subtraction of zero volts when in the non-scroll text or parameter modes. This means that the output of A2 will be $-R8/R4$ (output of A1) when in the non-scrolled text or non-text modes.

Amplifier A3 is a comparator whose output enables the beam intensity when the X deflection signal out of A1 gets more positive than the variable reference signal out of A3. This signal is used only in the text mode.

The operation of the circuit 30 shown in the drawing will now be described in first the horizontal non-scrolling text mode and then in the horizontal scrolling text mode. In general the terminal must rewrite all of the text and parameter information on the CRT screen several times a second (typically 60 times a second) for the display to appear solid and flicker free to the human eye. Each time the entire screen is rewritten is referred to as a refresh cycle. Each refresh cycle is basically broken into two portions; the parameter area portion first and the text area portion second. In this description, the portion of the refresh cycle when the text area is refreshed is referred to as the text mode of the terminal. It is only during the text mode that the described circuit will deviate functionally from the referenced patent. The circuit operates such that the parameter area of the CRT screen is not scrolled. The text mode decoder 62 switches the multiplexer 42 from the output of the constant generator 36 to the output of the counter 40 which, since the counter is not counting, is the initial value from generator 36. This switching occurs immediately after the parameter area has been rewritten and before the text area is rewritten during each refresh cycle. In the embodiment this constant or initial value is a count equivalent to 128 points and defines on the display screen the transition line 23 between the parameter section and the text section. The current equivalent of the constant value of 128 points in then applied to the current to voltage converter A4 and then to the subtractor A2 and comparator A3. The constant current source 70 is designed to offset the subtraction amplifier consisting of A2, R4, R6, R7 and R8 for a net subtraction of 0 when the output of amplifier A4 is equivalent to 128 points. Assume also that the value of the ΔX signal at 32 is a voltage equivalent to 128 points. Thus, comparator A3 enables the beam intensity as soon as the ramp signal starts to rise from zero, and the output of subtractor A2 is the sum of the ramp signal and the ΔX signal. Accordingly, the text is not scrolled and the display commences at line 23 of the CRT.

The operation of the circuit will now be described with reference to the horizontal scrolling feature of the invention. It is first to be assumed that it is desired to scroll the text information to the left on CRT 12. When the terminal switches to the text mode, determined by the text mode decoder, multiplexer 42 couples the counter 40 outputs to the converter 66. The counter 40 is initialized to an equivalent value of 128 points. The operator moves the switch to the left such that the counter 40 continuously at the clock rate counts up to a value in excess of an initial value. If the output of A4 is designated $V_R$ the respective outputs of comparator A3 and subtractor A2 are as follows:

$$V_{A3} = \text{"1" if } (V\Delta X + VRAMP) > V_R$$

$$V_{A2} = -(V\Delta X + VRAMP) + (V_R - V_{128})$$

Assuming VΔX to be equivalent to 128 points and $V_R$ equivalent to for example 228 points, it may be seen that A3 does not enable intensity until VRAMP rises in excess of a voltage corresponding to 100 points and that the A2 output is not at a voltage equivalent to 128 points until the ramp has increased to a voltage equivalent to 100 points. Thus, the effect of $V_R$ is to affect the time that the trace begins at the position corresponding to the dividing line 23. This then causes the display to move to the left. For scrolling right, the counter is made to count down from for example 228 which decreases the offset from 100 points, thereby making the text scroll to the right.

The embodiment of the present invention is intended to be merely exemplary and those skilled in the art shall be able to make numerous variations and modifications of it without departing from the spirit and scope of the present invention. In its broader aspect, the invention contemplates a similar circuit for providing vertical scrolling either separately from or simultaneously with the horizontal scrolling feature. All such variations and modifications are intended to be within the scope of the invention as defined by the appended claims.

What is claimed is:

1. In a video layout system of the type having a CRT display screen for viewing parameter information on a first section and text information on a second section, character generating means and vertical and horizontal positioning control means, the horizontal positioning control means including means for generating a ramp signal for controlling the horizontal sweep of an electron beam across the display screen of the CRT, an improvement comprising:

(a) means for selectively offsetting the start of the ramp signal so that any desired portion of text material having a pica format in excess of the width of the portion of the display screen for text material may be viewed to effect a horizontal scrolling of the text material, and (b) disabling means for selectively blanking the electron beam to prohibit text information from being displayed on the parameter section of the display screen.

2. The improved video layout system according to claim 1 wherein the offsetting means includes (a) means for subtracting from the non-offset ramp signal a selectable, variable reference level signal, and (b) means for generating the reference level signal for establishing the extent and direction of movement of the text information on the display screen.

3. The improved video layout system according to claim 2 wherein the reference signal level generating means includes:

(a) counter means for counting a clock signal and being capable of counting up and down, (b) means for initializing the counter means with a count representative of the transition on the display screen between the parameter and the text sections, (c) means for selectively starting the counter in a count up or down mode depending upon whether the text material is to move to the left or to the right, and (d) means for converting the output count from the counter means into a proportional analog signal.

4. The improved video layout system according to claim 3 further includes multiplex means disposed between the counter means and the converting means for applying to the converting means either the counter output or an initial constant value.

5. The improved video layout system according to claim 1 wherein the disabling means includes a comparator means comparing the non-offset ramp signal with the counter output in analog form and disabling the beam intensity until the non-offset ramp signal exceeds the amplitude of the counter means.

6. A horizontal deflection control circuit for a video layout system of the type providing a first signal which is a ramp for sweeping an electron beam across a CRT display screen and a second signal of predetermined constant amplitude for establishing the starting location for sweeping the beam including:

(a) means for adding the first and second signals to produce a third signal which is a ramp signal commencing at the level of the predetermined initial amplitude.

(b) means for generating a fourth signal having a variable and selectable amplitude equal to or in excess of the second signal, and (c) means for subtracting the excess portion of the fourth signal amplitude from the amplitude of the third signal to produce an offset deflection control signal which is delayed in reaching the level of the second signal to permit scrolling of the information displayed on the screen.

7. The circuit according to claim 6 wherein the fourth signal generating means includes (a) a counter having an initial count and capable of counting clock pulses up from or down to the initial count, (b) switch means for activating the counter, and (c) means for converting the count to an analog form.

8. The circuit according to claim 7 wherein the subtracting means includes:

(a) a differential amplifier receiving the third signal at a first input and the fourth signal at a second input, and (b) constant current source means coupled to the second input for reducing the fourth signal by the amount of the initial count in the counter.

9. In a video layout system of the type having a CRT display screen for viewing text information in a predetermined portion of the screen, character generating means for controlling the intensity of an electron beam in the CRT and means for controlling the position of the beam in a vertical and horizontal direction of the CRT, the positioning and character generating means being operative in synchronism to display text information, an improved scrolling circuit for moving the displayed text information in at least one of the vertical and horizontal directions comprising:

(a) means for selectively inserting a controlled offset voltage into at least one of the vertical and horizontal positioning circuits to move the text information in at least one of the directions so that a portion of the text information not previously on the screen area comes into view, and (b) means for disabling the electron beam when the vertical and horizontal positioning means position the beam outside the predetermined text portion of the screen so that the text information formerly displayed on the screen disappears.

10. A video layout system for viewing parameter information on a first section and text information on a second section of a CRT display screen comprising:

(a) a horizontal positioning means for controlling the position of an electron beam within the CRT, the positioning means including means for providing an initial beam position signal for displaying text information and means generating a ramp signal for sweeping the beam horizontally from the initial beam position to the opposite end of the second section, (b) character generating means for controlling the beam intensity as the beam is positioned by the positioning means to display the text information, (c) a vertical positioning means for controlling the beam position, (d) means for summing the initial beam position signal and the ramp signal to produce a horizontal deflection signal which is in synchronism with the character generating means, (e) means for generating a controlled offset signal equal to or greater than the initial position signal, (f) subtractor means for removing a portion of the offset signal from the deflection signal so that the deflection signal does not reach the initial position signal level until the ramp signal reaches a certain amplitude thereby controllably unsynchronizing the deflection signal with respect to the character generating means so that the text information appears to move in a horizontal direction.

11. The video layout system according to claim 10 further including comparator means for comparing the amplitude of the offset signal and the deflection signal and for disabling the beam until the deflection signal amplitude exceeds that of the offset signal to inhibit display of text information on the parameter viewing section of the CRT screen.

12. A video layout system for fitting prepared text in a desired layout for driving typesetting equipment comprising:

means for displaying an image of said text on a portion of a surface, means for establishing at least one command that is not to be printed specifying a parameter of said text image, means for displaying said command on a second portion of said surface simultaneously with the displaying of said text image said text image conforming to said command, means for changing at will said text and said command, and means for moving the text across the portion of the surface in a controlled manner.

13. A video layout method for fitting prepared text in a desired layout for driving typesetting equipment comprising the steps of displaying an image of said text on a portion of a surface, establishing at least one command that is not to be printed specifying a parameter of said text image, displaying said command on a second portion of said surface simultaneously with the displaying of said text image said text image conforming to said command, changing at will said text and said command, and moving the text across the portion of the surface in a controlled manner.

* * * * *